Figure 1:
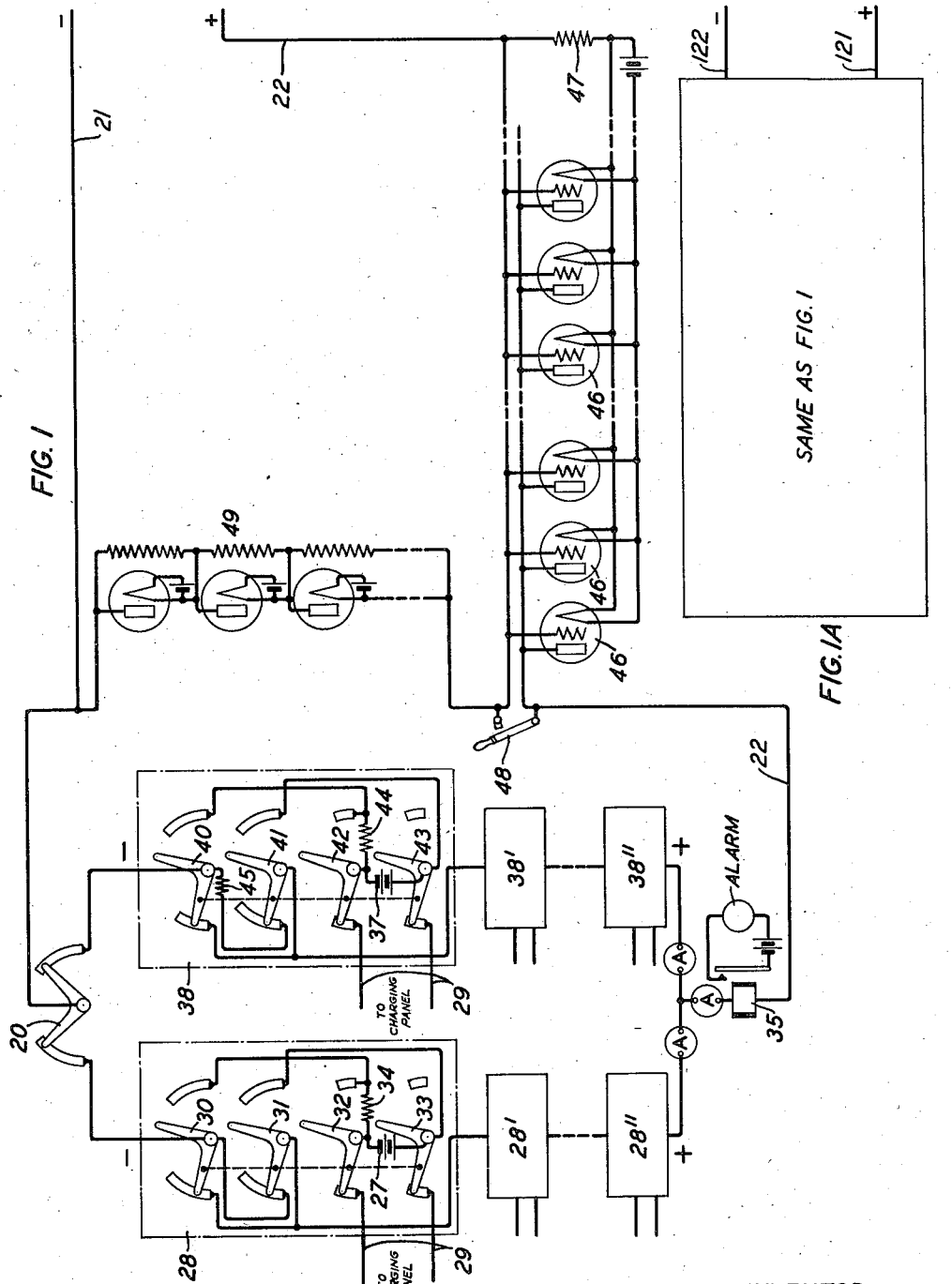

Nov. 12, 1935.  O. B. JACOBS  2,020,316
SUBMARINE CABLE SYSTEM
Filed Dec. 15, 1933   3 Sheets-Sheet 3
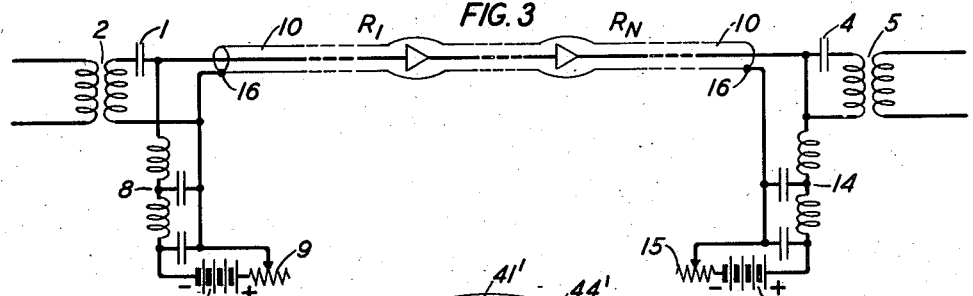
FIG. 3
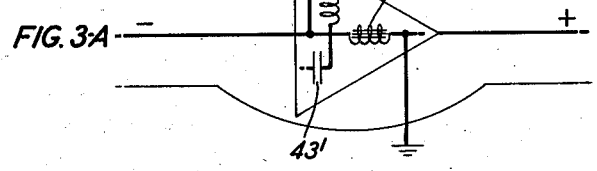
FIG. 3-A
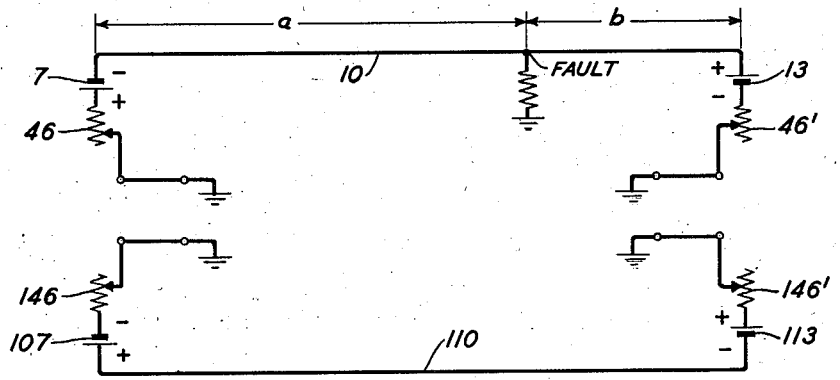
FIG. 4
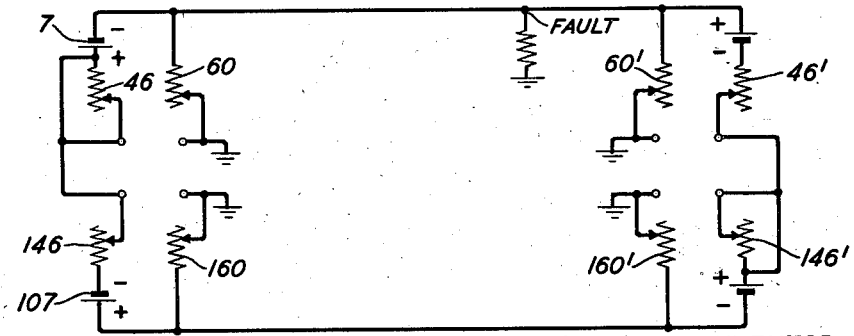
FIG. 5
INVENTOR
O. B. JACOBS
BY H. A. Burgess
ATTORNEY Patented Nov. 12, 1935

2,020,316

UNITED STATES PATENT OFFICE 2,020,316

SUBMARINE CABLE SYSTEM

Oliver B. Jacobs, Morristown, N. J., assignor to Bell Telephone Laboratories, Incorporated, New York, N. Y., a corporation of New York Application December 15, 1933, Serial No. 702,449

12 Claims. (Cl. 178—63)

The present invention relates to a submarine cable system adapted to be supplied with energizing current from a source of voltage located at a terminal or other station. The invention has particular application to a submarine cable system including one or more repeaters adapted to be energized by current sent over the cable.

In the case of a submarine cable on which a fault in the form of a leak to ground occurs at a point along the cable, whether or not the cable contains repeaters of the type referred to, the invention comprises as one feature a proportioning and disposition of the terminal circuits, including the source of current referred to, such that the potential of the cable at the point where the fault occurs is ground potential, slightly negative or some other potential with respect to ground.

It has been proposed to equip submarine cables adapted for the transmission of speech currents, carrier current signals and other types of signals, with space discharge tubes or other types of repeaters at one or more points along the cable and to supply the energizing current for these repeaters from a battery or other suitable source located at a terminal station. These repeaters may be submerged or may be located on artificial or natural islands or otherwise disposed. One example of a submarine cable system equipped with submerged repeaters is that disclosed and claimed in U. S. application of Buckley and Jacobs, Serial No. 692,370, filed October 6, 1933. While the invention is capable of application to various types of cable systems it will be assumed for simplicity of description, in the detail description to follow, that the circuit features of the invention are embodied in a cable system of the type disclosed in the Buckley-Jacobs application.

The current supply and control equipment for a submarine cable of the type referred to must be capable of meeting a variety of conditions in actual service. If the cable is a long one and is equipped with a number of repeaters as disclosed in the Buckley-Jacobs application, current must be supplied at a terminal of the cable at a voltage amounting to several hundred volts, voltages of one thousand to two thousand volts being considered practical with suitable types of cable construction. Where voltages of this order are employed the possibility of violent current surges in the cable are very great. For example, the sudden application or removal of the source of voltage or a change in the applied voltage might cause serious damage to the cable insulation, the repeaters, the loading material, if any, or otherwise deleteriously affect the cable system. Preferably, of course, the current should at all times be held constant on the cable except as it may need to be varied to control the gain of the repeaters.

It is frequently necessary in practice to alter the terminal circuit of a cable in order, for example, to take a cable out of service or to put it into service, to test the cable, to connect it in circuit with a second cable, or (more rarely) to accommodate the terminal connections to a fault condition on the cable. Where voltages of the order mentioned are involved it becomes a difficult matter to effect the various circuit changes that may be necessary in practice while at the same time adequately protecting the cable against the possibility of a sudden change in terminal voltage such as might injure the cable or associated apparatus. Moreover, if storage batteries are used as the terminal source of voltage for a cable the problem arises of charging the batteries without producing disturbing voltages in the cable system.

It is a general object of the invention to supply suitable energizing current to a submarine cable under the various conditions met with in practice while adequately protecting the cable system against deleterious current surges.

In a system containing repeaters supplied with energizing current over the cable, it is important to maintain the current at the value to give the desired repeater gain as has been pointed out in the Buckley-Jacobs application.

It is an object of the invention to control automatically the current supplied over the cable to maintain the current at the desired value.

Figure 2:
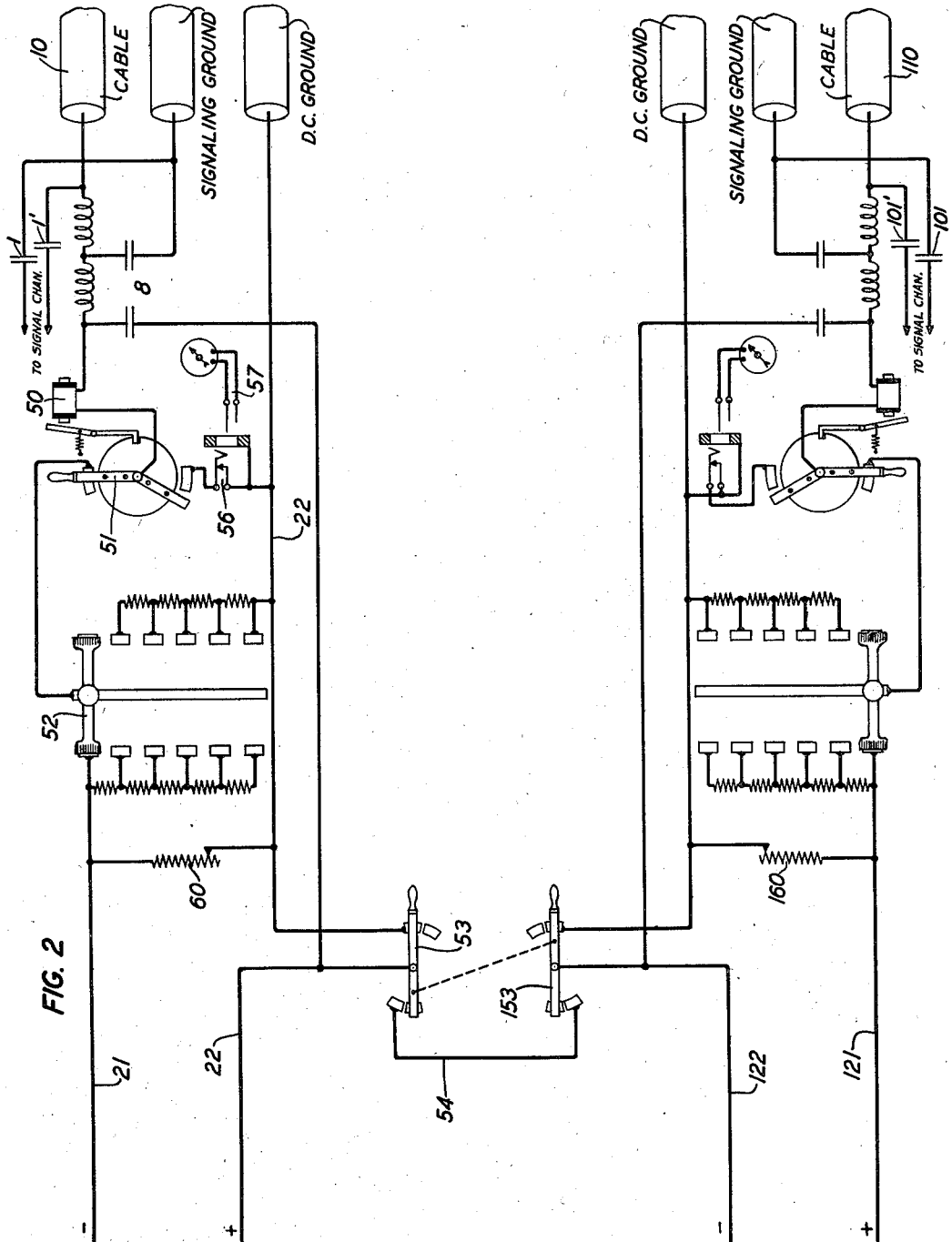

Various subsidiary objects and features of the invention will appear, and the invention will be more fully understood, from the following detained description of preferred embodiments, reference being made to the accompanying drawings in which:

Figs. 1, 1A and 2, when placed side by side, with Figs. 1 and 1A at the left, show in simplified schematic form a current supply and control system for two submarine cables individually or in common;

Figs. 3, 4 and 5 show simplified circuit diagrams of a complete cable system, Figs. 4 and 5 illustrating terminal circuit alterations in accordance with the invention adapted to a fault condition on the cables; and Fig. 3A shows a detail modification of one repeater circuit.

It will facilitate understanding Figs. 1, 1A and 2 if reference is first made to Fig. 3 which is the same as Fig. 1 of the Buckley-Jacobs application supra and is reproduced here for ease of reference.

The cable 10 of Fig. 3 is shown terminating in circuits for enabling it to transmit both signaling currents, and direct current from sources 7 and 13. The signals are applied, through the coupling 2 in series with condenser 1, between the cable core and return conductor 16. Similarly, at the receiving end they are received in the circuit including condenser 4 and repeating coil 5 connected across the cable core and the return conductor. Filters 8 and 14 prevent the signals from passing into the battery circuits. The purpose of the direct current is to energize the thermionic repeaters $R_L$ to $R_N$ that are connected to the cable 10. This current supplies filament heating energy, anode voltage and grid bias voltage to each repeater as described more fully in the Buckley-Jacobs application. Resistances 9 and 15 enable the direct current to be suitably regulated. By varying this current the gain of the repeaters can be controlled.

Referring now to Figs. 1, 1A and 2, placed with Figs. 1 and 1A at the left of Fig. 2, there is shown the direct current supply and control system for each of two cables 10 and 110. These cables may be alike and each used independently of the other for signal transmission. It will be assumed that both cables terminate at the same stations at each end. While the terminal connections might be as in Fig. 3, separate grounds for the direct current and the signaling currents are shown. The direct current ground may be a local or sea earth and the signaling ground might be a separate local or sea earth connection, for example.

The source of direct current for supplying the cable 10 is shown at the left of Fig. 1 as a battery comprising a number of banks of cells 27, connected in series, and a second battery comprising a similar number of banks of cells 37, both batteries being connectible in parallel by switch 20 to the main leads 21 and 22.

The bank of cells 27 comprises a convenient sized group for charging and is included in a charging unit 28, which by means of switches may be put in series with similar units 28', 28'', etc. Similarly, bank 37 is comprised in a charging unit 38 which may be put in series with other similar units 38', 38'', etc.

To illustrate the manner of switching and charging the cells, group 27 is shown out of circuit with mains 21 and 22 and in circuit with charging leads 29. By means of switches 30 and 31 of unit 28 the adjacent unit 28' is connected direct to main 21. When cells 27 have been charged, the gauged switches 30, 31, 32, 33 are thrown in unison from their left position to their right position. Upon the first part of the movement, switches 32 and 33 break connection with charging leads 29. With continued movement, switches 30 and 31 make their right hand connections without breaking their left hand connections, and thus put a zero resistance shunt around battery 27 and resistance 34 in series, without breaking the connection from unit 28' to main 21. Further movement causes switches 30 and 31 to break their left hand connections, thus removing the shunt around battery 27 and resistance 34 and effectively connecting these in series between unit 28' and main 21. The last part of the movement causes switch 32 to shunt out resistance 34 leaving battery 27 connected between unit 28' and main 21.

For illustration a slightly different switching scheme is shown for unit 37. Here switches 40—43 are similar to 30—33, resistance 44 is similar to 34 but another resistance 45 is included in the circuit in such manner as to make an additional step in the process of including or removing a bank of cells. Upon the initial movement, switches 42 and 43 disconnect the charging leads 29, as before. With continued movement, switches 40 and 41 put a zero resistance shunt around battery 37 and resistance 44 in series, without breaking the connection from unit 38' to main 21. Then switch 40 breaks its left hand connection leaving resistance 45 in series between unit 38' and main 21 which also makes resistance 45 take the place of the zero resistance shunt. Further movement removes resistance 45 from the circuit (at left contact of switch 41) leaving battery 37 and resistance 44 in series. The end of the movement shunts out resistance 44 leaving battery 37 alone in the connection.

In throwing the switches from the discharge position to the charge position (shown) the steps are gone through in the reverse order to that given above. Leads 29 are connected to any suitable source of charging current, such as a generator, motor-generator or rectifier.

By charging the batteries in sections and performing the switching operations on small groups of cells, a lower voltage charging source may be used than if the entire battery were charged as a unit and the terminal voltage is kept more nearly constant since at no time need the voltage between mains 21 and 22 be varied by as much as the difference between the charge and the discharge voltage of the whole battery. Certain cells are or may be at full charge voltage while others in the same battery are or may be at or near discharge voltage. Both main batteries may be in circuit in parallel when switch 20 is in the position shown, or by movement of this switch either battery alone may be used, the other constituting a spare or undergoing repairs, being switched, etc. However, the movement of switch 20 is limited so that both circuits cannot be opened at the same time. Excess current alarm relay 35 is shown connected between the lower end of the batteries and main 22.

Included serially in main 22 is an automatic current regulating circuit comprising parallel tubes 46 having their grids all connected to derive a negative bias voltage from series resistor 47 in main 22. Tubes 46 operate at near saturation current normally. A tendency toward increased current through main 22, tubes 46 and resistance 47 is accompanied by increased negative voltage on the grids which increases the impedance of tubes 46 and opposes the current increase. A tendency toward decreased current flow changes the grid voltage in the positive direction and decreases the tube impedance, tending thus to increase the current. The tubes 46, in number and tube characteristic, and resistance 47, are preferably chosen to give as nearly constant current regulation as possible, although this may be varied to suit conditions. Switch 48 shunts out the regulator when desired.

The reverse-current shunt 49 comprising a number of series tubes is for the purpose of passing current received from the battery at the distant terminal when for any reason the local battery is open-circuited, thus preventing a dangerously high voltage surge.

The circuit for the direct current supply to the cable 10, as will now be evident from the foregoing description, is from core of cable 10, through filter 8, relay 50, switch 51, switch 52 (both in positions shown) main 21, switch 20, either or both main batteries as described, alarm relay 35, main 22 through current regulator circuit including tubes 46 and resistor 47, switch 53 to the direct current ground for the cable. The branch for the signaling current is through condensers 1 and 1' which may lead to signal circuits as disclosed more fully in the Buckley-Jacobs application supra.

It will be noted that none of the circuits of Fig. 1 provides for opening the circuit. The various switching operations of that figure may be carried out without interrupting the main circuit. In Fig. 2 provision is made for disconnecting the power sources from the cable for testing or other purposes. Accidental movement of these switches in an improper sequence such as might result in damage to the cable system or testing apparatus may be prevented by an interlock as will be described.

Assuming that it is desired to remove the power sources of Fig. 1 from cable 10, switch 52 is moved downward from its illustrated, normal position. The brushes of this switch make the next contact before breaking the last, and by the downward movement introduce first a large and then a successively smaller resistance between cable 10 and main 22, at the same time keeping a high resistance from main 22 across to main 21 on the battery side, and building up a high resistance from the cable to battery main 21. Ordinarily the movement of switch 52 would be made in conjunction with a similar operation at the distant terminal by agreement with the distant attendant. When switches 52 at both terminals are at their lowermost position the cable is without current and relay 50 at each station then releases, unlocking switch 51 and permitting it to be moved to connect testing jack 56 directly across the cable and direct current ground. Test jack and meter 57 may be used to make a direct current test of the cable.

Preferably an interlock (not shown) is provided between switches 51 and 52 so that the latter can not be restored to its normal (shown) position until after switch 51 has been put in normal (shown) position.

The cable 110 of Fig. 2 cooperates with the power supply and control panel of Fig. 1A over leads 121 and 122 and the switching devices shown adjacent to the cable in a similar manner to that described for cable 10 and is associated apparatus. The apparatus of Fig. 1A may be identical with that of Fig. 1 but it will be noted that the negative pole is in this case connected to ground conductor 122. The relative positions of the battery charging units, switch 20, relay 35 and the automatic current regulating circuit may be interchanged in any suitable manner if desired. A signaling branch is derived for cable 110 through condensers 101, 101', this branch being connected between the cable core and the signaling ground.

Cable 10 may be used entirely independently of cable 110 or cable 10 may be used to transmit east while cable 110 serves as the return or westward cable.

With the sources of energizing current grounded at both ends of a cable system of the type under discussion, earth current effects which manifest themselves as an apparent difference in potential between the grounds at the two ends of the cable system, might cause particular difficulty in regulating the energizing currents in the cables during periods of magnetic storms. Under such conditions, changes of the sort just described might tend to increase the current in one cable while tending to decrease the current in the other. These effects may be minimized by connecting the sources of direct current in series and removing the ground connections at one or both ends of the system. Such a direct series connection also will avoid electrolysis effects caused by current passing between the two cable sheaths in the vicinity of the points where the direct current ground conductors terminate. These considerations may make it desirable to operate normally with the sources of energizing current in series, leaving the use of grounds at both ends of the system to cases where special conditions make it advisable, as discussed later.

The direct current sources of cables 10 and 110 may be placed in series by throwing switches 53 and 153 to their alternate positions. This disconnects the grounds designated as direct current ground in Fig. 2. When operating the two cables in series as regards their direct current supply, one regulator at each station may be shunted out by closing switch 48 of Fig. 1 and a similar switch in the distant terminal of the two cables.

If the proper operation of the cable system requires that one cable be supplied with a slightly more energizing current than the other cable, it will be necessary with the series operating arrangement to adjust the regulating circuit for the larger value of current and to shunt the excess current to ground in order to by-pass the cable requiring the lower value of current. Adjustable resistances 60 and 160 are provided for this purpose but only one of them normally would be used, the other being left open. Thus, at both ends of the cable requiring the lower value of current, a shunt resistance would by-pass the proper amount of current. In order to insure that the proper amount of current will be by-passed regardless of earth current conditions, it may be necessary to include a current regulating circuit in the by-pass resistance circuit similar in type to that shown in Fig. 1 or of any other suitable type.

In Fig. 4 the two cables 10 and 110 are represented with terminal earth connections through the current supply circuits that have been described, the resistance labeled 46 being intended to represent the tubes 46 of Fig. 1, in the case of cable 10, similar resistances being 46' at the other terminus of this cable, and 146 and 146' for cable 110.

If a fault to ground develops at some point along either cable, as indicated on cable 10, and if the resistance to ground is sufficiently high to permit signaling to be carried out over the cable, the terminal voltages can be adjusted so that the cable conductor at the fault will be substantially at ground potential, or, if desired, so that it will have a potential negative or positive with respect to ground. For example, if the fault is distant $a$ from the left terminal and $b$ from the right terminal, then by adjusting the voltage $V_7$ of source 7 and voltage $V_{13}$ of source 13 so that $$\frac{V_7}{V_{13}} = \frac{a}{b}$$

the cable at the point of fault is at ground potential. If $$\frac{V_7}{V_{13}} < \frac{a}{b},$$

the cable is positive at the point of fault. This latter may be desirable in order to "seal" the fault. The same practice may, of course, be followed on cable 110 in case of a fault.

Fig. 5 illustrates the case of both cables being connected in series as regards direct current supply. Regulators 46 and 146' are shown strapped out (as by closure of switch 48, Fig. 1 in each case) leaving one regulator at each terminal operative, viz., 146 and 46'. By means of the shunt resistances 60, 60' and 160, 160' unequal currents can be supplied to the two cables as may be desired. In the absence of a fault to ground on either cable, only two of the shunt resistances would be used. For instance, if cable 10 requires less current than cable 110, then shunts 60 and 60' would be adjusted to have substantially equal values and sufficient total resistance to by-pass the desired amount of current, while resistances 160 and 160' would be opened. In case of a fault of the above indicated type on either cable, say cable 10 as shown, the point of fault can be made at ground potential or at some other potential by adjustment of these shunt resistances. If the fault is in the same location as in Fig. 4, the cable conductor may be made to have ground potential at the point of fault by making resistance 60 bear the same relation to resistance 60' as $a$ bears to $b$, the total being made such a value as will result in by-passing the proper amount of current. However, if the fault is on cable 10, but that cable requires a larger energizing current than cable 110, then the by-passing must be accomplished by resistances 160 and 160'. These may be proportioned in such a way that the conductor of cable 10 at the point of fault will be substantially at ground potential. If a similar fault should develop on both cables, the shunt resistances for the cable requiring the lower energizing current should be adjusted for the fault on that cable in the manner previously described. Next the magnitudes of the potentials of the power sources at the two terminals should be adjusted so that the total potential applied at each terminal will be equal to the IR drop in the two cables on the side of the two faults toward the terminal in question.

As previously indicated, the potentials at points of fault may be made to differ moderately from ground potential, either positively or negatively, by adjusting the shunt resistances so that the point where the cable conductor is at ground potential will be a suitable distance from the point of fault in the desired direction.

It was described above in connection with Fig. 3 that the automatic regulator 46 of Fig. 1 may be used to control the current supplied to all of the repeaters $R_L$ to $R_N$ to control their gain. Fig. 3A represents a direct current connection to ground at one of the repeaters, for example, the central repeater of the system. This ground connection is made at such a point as not to shunt off the signaling currents. For example, it is made at the branch, within the repeater, that carries only direct current and, therefore, between the two retards 44 and 49 of the Buckley-Jacobs application supra, preferably at the direct current terminal of one of the retards. The circuit diagram of Fig. 3A indicates the ground as made at the right-hand terminal of retard 44' which corresponds to retard 44 of the Buckley-Jacobs application.

When a direct current connection to ground is made at one of the repeater points, those repeaters whose direct current energizing paths lie to the left of that point are energized from the source at one terminal while the remaining repeaters receive their energizing current from the other terminal. In Fig. 3A, the repeater indicated receives its energizing current from the right in the figure. Those repeaters lying to the right of this particular repeater likewise receive their energizing current from the right. Those lying to the left are energized by current received from the left terminal.

Such a ground allows the terminal supplies to operate independently of each other. Different values of current may be used on different sections of cable. Each regulator 46, 46' at opposite terminals then operates independently of the other and regulates only the current sent out from that respective terminal.

One advantage of having the cable divided as to its direct current supply can be seen from considering the case where the gain of only one repeater somewhere on the line has fallen to a low value.

Separate control of the gains of the repeaters in the two halves of a cable permits somewhat more latitude in compensating for loss of gain in repeaters which eventually become impaired, than would be the case with a single control.

Instead of grounding only one repeater, each of two adjacent repeaters may be provided with a ground such that no direct current flows over the intervening cable section since these two repeaters are energized from different ends of the system. Each grounding point must be located so that the current passes through the energizing paths of the repeater before the ground point is reached. In Fig. 3A, for example, it was explained that the current which energizes the repeater shown is from a source located at the right of the figure. If the source were at the left instead, the ground would be made at the right-hand end of the direct current path within the repeater, that is, at the direct current end of retard 49 in the Buckley-Jacobs application.

With grounds at one repeater near the center of each cable, or at two adjacent repeaters in each cable, the sources of current at the terminals may be grounded or may be placed in series between the two cables, with a suitable shunt to ground across the supply lead to the cable requiring the lesser energizing current. The system with grounded central repeaters may be designed to use the same polarity of supply at both ends of the same cable, if desired. An advantage of using a single grounding point and opposite potentials of supply on a cable is that electrolysis effects at the grounding point would be minimized.

What is claimed is:

1. The combination with a submarine cable containing a repeater adapted to be energized by direct current sent over the cable, of a terminal source, said source comprising a number of groups of secondary battery cells, said groups of cells adapted to be connected in series to said cable, switching means for switching the groups of cells separately into and out of circuit while maintaining the continuity of the circuit through the cable and the remaining groups of cells, and means to charge groups of cells so switched out of circuit.

2. A combination according to claim 1 including a current controller in series with said cable for opposing the current variations in the cable circuit.

3. The combination of a pair of submarine cables each including repeaters adapted to be energized by direct current sent over the cable, of a source of direct current for each cable, a direct current ground for each cable, and switching means for throwing said cables and said sources in series while maintaining the continuity of the circuit through said sources and cables unbroken.

4. The combination of claim 3, said switching means breaking the connections between said sources and the direct current ground, and means for including an adjustable amount of resistance in shunt from said cables to ground.

5. The combination with a submarine cable equipped with repeaters supplied with energy by direct current sent over the cable, of variable attenuating means for gradually reducing to zero the applied terminal voltage whereby a surge of current on the cable is avoided, and means for thereafter short-circuiting the cable.

6. In combination, a submarine cable, a terminal source of voltage therefor at each terminal, said sources being in series with each other and the cable, a protective shunt around each terminal source, said shunt having a unilateral current carrying characteristic and being connected to oppose the passage of current from the adjacent source but offering a discharge path in series with the cable for current from the source of voltage at the distant terminal in case of failure of the adjacent source.

7. In combination, a submarine cable connecting terminal stations and containing repeaters supplied with energizing current over the cable, a source of energizing current at each terminal station connected between the cable and ground, and a direct current connection to ground from said cable at a repeater point intermediate certain of said repeaters.

8. The combination of claim 7 including a regulator at each station for regulating the current supplied to said cable from that station.

9. The combination of claim 7, including means to send signals over said cable from one terminal station to the other, and means to prevent said direct current connection from shunting signaling currents from said cable.

10. The method of operating a cable having a fault to ground comprising supplying terminal voltage of respectively opposite polarity at each end of the cable between the cable and ground and proportioning the voltage applied at each end with respect to the distance from the respective terminal to the point of fault to such value that the cable at the point of fault has a desired potential with respect to earth while keeping the current in the cable the same regardless of the location of the fault.

11. The method of operating two cables, one of which has a fault to ground, comprising supplying terminal voltages at both ends to both cables in series, and proportioning the terminal voltages with respect to distances from the terminals to the point where the fault occurs, to values such that the cable at the point of fault has a desired potential with respect to earth, keeping the current on the cable the same regardless of the fault location.

12. The method comprising proportioning the voltages according to claim 11 and proportioning the current on one cable to a different value from the current on the other.

OLIVER B. JACOBS.